United States Patent
Okura

[15] 3,680,459
[45] Aug. 1, 1972

[54] CAMERA OBJECTIVE ADJUSTABLE FOR FLASH AND NON-FLASH PHOTOGRAPHY

[72] Inventor: Zenichi Okura, Ichikawa, Japan
[73] Assignee: Asahi Kogaku Kogyo Kabushiki Kaisha, Tokyo-to, Japan
[22] Filed: Oct. 27, 1971
[21] Appl. No.: 192,817

[30] Foreign Application Priority Data

Nov. 6, 1970 Japan..................45/110787

[52] U.S. Cl. ..................95/64 R, 95/44 R, 95/64 A
[51] Int. Cl. ..................................G03b 9/02
[58] Field of Search ..........95/64 R, 64 A, 66 B, 44 R

[56] References Cited

UNITED STATES PATENTS

| | | | |
|---|---|---|---|
| 3,067,663 | 12/1962 | Kremp | 95/64 A X |
| 3,071,056 | 1/1963 | Gebele | 95/64 A |
| 3,447,441 | 6/1969 | Ort | 95/64 A X |
| 3,494,271 | 2/1970 | Muryoi | 95/64 A X |

Primary Examiner—Samuel S. Matthews
Assistant Examiner—Robert P. Greiner
Attorney—Harold D. Steinberg et al.

[57] ABSTRACT

A camera objective which may be adjusted so that in one position it is adapted for use with flash illumination and in another position it is adapted for operation without flash illumination. The objective has a focus ring, a diaphragm ring, and an intermediate ring situated therebetween. The intermediate ring is adjustable angularly with respect to the focus ring in accordance with a selected film speed while the diaphragm ring is adjustable angularly with respect to the intermediate ring in accordance with a selected flash guide number, and when the objective is used during flash photography rotary movement of the focus ring to focus the objective is transmitted through the intermediate ring to the diaphragm ring for setting the diaphragm at an automatically determined aperture in accordance with the factors of film speed and flash guide number. In the non-flash position of the objective, the diaphragm ring is freely rotatable with respect to the intermediate ring to a selected position which will provide a preselected aperture.

7 Claims, 3 Drawing Figures

PATENTED AUG 1 1972 3,680,459

INVENTOR
ZENICHI OKURA
BY
Steinberg and Blake
ATTORNEYS

CAMERA OBJECTIVE ADJUSTABLE FOR FLASH AND NON-FLASH PHOTOGRAPHY

BACKGROUND OF THE INVENTION

The present invention relates to cameras.

In particular, the present invention relates to camera objectives.

The present invention is particularly applicable to a camera objective which enables the photographer to make a manual selection of the exposure aperture during non-flash operation of the camera while providing for automatic determination of the exposure aperture when an exposure is to be made in synchronism with flash illumination, with the automatic setting of the aperture at this time being brought about by focusing of the objective.

When exposure is made with flash illumination, such as with light emitted from a source such as a xenon discharge tube, it is conventional to determine the exposure by adjustment of the diaphragm aperture since the duration of light emission from a source such as a zenon discharge tube is too short to allow for adjustment of exposure in accordance with the shutter speed. Under these conditions it is well known that the size of the diaphragm aperture is determined according to the relation between the amount of light emitted from the light source and the distance between the camera and the object which is photographed. The photographer, therefore, provided with one determining factor in accordance with the amount of light which will be emitted by the light source, indicated by a given flash guide number, calculates the required size of the diaphragm aperture in accordance with a quotient obtained by dividing the guide number by the distance from the camera to the object which is to be photographed. This necessity of calculating the required aperture is exceedingly troublesome and inconvenient, and in addition provides an undesirable source of error in the exposure.

There have already been proposals to provide for automatic determination of the exposure aperture under these conditions, in accordance with the extent to which the focus ring is turned for focusing the objective. However, such conventional devices are exceedingly complex in that the adjustment of the diaphragm aperture by turning the focus ring necessitates complex mechanisms to assure a proper aperture in accordance with the turning of the focus ring.

SUMMARY OF THE INVENTION

It is accordingly a primary object of the present invention to provide a camera objective which will avoid the above drawbacks.

In particular, it is an object of the invention to provide a camera objective which does not require any complex mechanisms for automatically determining the size of the diaphragm aperture in response to turning of the focus ring when an exposure is to be made wish flash illumination.

An additional object of the present invention is to provide a camera objective which can be easily and conveniently manipulated in order to provide either for photography with flash illumination or for photography without flash illumination.

Furthermore it is an object of the present invention to provide a camera objective which is easily manipulated to provide for automatic determination of the size of the aperture during flash illumination according to a pair of factors one of which is the film speed and the other of which is the flash guide number.

Also, it is an object of the present invention to provide a camera objective which will have the appearance of a conventional objective during non-flash operation while rendering visible a flash guide number scale only during flash operation.

Yet another object of the present invention is to provide an exceedingly simple but highly effective transmission capable of transmitting rotary movement from the focus ring to the diaphragm ring during flash illumination while releasing the diaphragm ring for free rotary movement with respect to the focus ring during non-flash operation.

According to the invention the camera objective includes an elongated lens barrel carrying a rotary focus ring means which coaxially surrounds the lens barrel and is turnable with respect thereto for focusing the objective. A diaphragm ring means also coaxially surrounds the lens barrel and is rotatable with respect thereto for setting the diaphragm, and between the focus ring means and the diaphragm ring means is an intermediate ring means which forms with the diaphragm ring means a pair of ring means one of which is movable with respect to the other between a flash position and a non-flash position. The focus ring means carries distance graduations which are angularly distributed according to an arithmetic progression with respect to the distance between the camera and the object to be photographed, where this latter distance varies according to a geometric progression. The focus ring means also carries a film speed scale having graduations uniformly distributed with respect to each other. The diaphragm ring carries aperture setting graduations which are uniformly distributed therealong, and the intermediate ring means carries uniformly distributed graduations of a flash guide number scale to enable the angular position of the diaphragm ring means to be determined with respect to the intermediate ring means according to a flash guide number while enabling the intermediate ring means to be angularly positioned with respect to the focus ring means according to film speed as determined by the graduations of the film speed scale. A transmission means provides for transmission of rotary movement of the focus ring means to the diaphragm ring means through the intermediate ring means when the objective is set for flash operation with the diaphragm aperture automatically determined at this time in accordance with the angular position of the intermediate ring means with respect to the focus ring means according to the film speed and the angular position of the diaphragm ring means with respect to the intermediate ring means in accordance with the flash guide number. The diaphragm ring means can be shifted with respect to the intermediate ring means to a non-flash position where the scale of flash guide numbers will be covered and where a releasable holding means coacts with the diaphragm ring means to releasably hold the latter at a preselected angular position in accordance with a selected diaphragm which can be manually set during non-flash operation.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
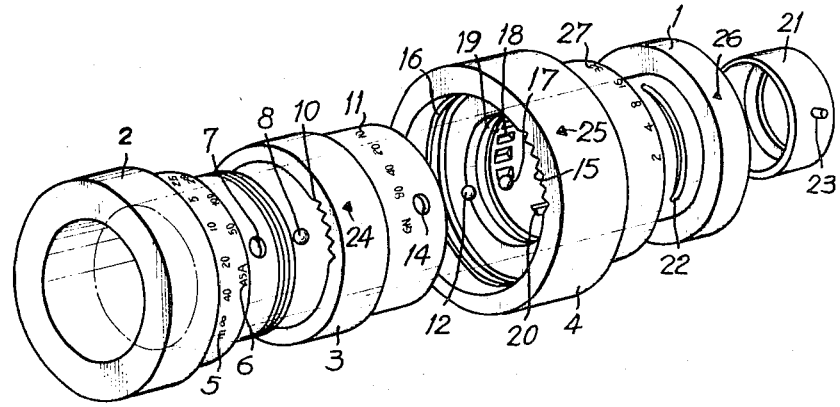
FIG. 1 is an exploded perspective view of an objective according to the invention.

Referring now to the drawings, the objective illustrated therein includes an elongated lens barrel 1 capable of being fixed, releasably, for example, at its right end, as viewed in the drawings, to the front wall of a camera housing in a well known manner. This lens barrel 1 will in a conventional manner house in its interior the lenses of the objective as well as the diagphragm mechanism. The particular objective illustrated may be used, for example, with a single lens reflex camera which has a focal plane shutter so that in the illustrated example the objective need not have a between-the-lens shutter.

The lens barrel 1 supports for rotary movement at its front end region a focus ring means 2 which coaxially surrounds the barrel 1 and which is rotatable with respect thereto for focusing the objective in a well known manner. The lens barrel is also coaxially surrounded by a diaphragm ring means 4 which is rotatable with respect to the lens barrel for setting the diaphragm, and between the focus ring means 2 and the diaphragm ring means 4 is an intermediate ring means 3 which also coaxially surrounds the lens barrel 1. Thus, from the front toward the rear of the lens barrel 1 are situated the focus ring means 2, the intermediate ring means 3, and the diaphragm ring means 4.

The focus ring means 2 carries distance graduations 5 distributed at regular intervals circumferentially along the focus ring means 2. At its rear portion the focus ring means 2 has an extension of relatively small diameter which is overlapped and surrounded by the intermediate ring means 3. Just in front of the intermediate ring means 3 the focus ring means 2 carries behind the distance graduations 5 a scale 6 of film speeds the graduations of which also are distributed at regular intervals circumferentially along the ring means 2 just in front of the intermediate ring means 3. This rear, small-diameter portion of the ring means 2 is formed with an opening 7 passing therethrough. A steel ball 8 is situated partly in the opening 7 and is pressed radially away from the optical axis by a spring 9 as diagrammetically illustrated in the drawings. The inner surface of the intermediate ring means 3 which surrounds the small-diameter portion at the rear of the focus ring means 2 is formed with a plurality of axially extending circumferentially distributed grooves 10 of V-shaped cross section capable of selectively receiving the spring-pressed ball 8. The parts 7–10 form an adjustable transmission means for transmitting rotary movement from the focus ring means 2 to the intermediate ring means 3 while at the same time permitting the latter to be angularly adjusted with respect to the ring means 2, this angular adjustment being brought about while the ball 8 clicks from one groove 10 to another in order to align an index 24 at the exterior of the intermediate ring means 3 with a selected graduation of the film speed scale 6. In this way the adjustable transmission means 7–10 enables the intermediate ring means 3 to be angularly adjusted with respect to the focus ring means 2 according to a selected film speed while at the same time connecting the ring means 2 and the ring means 3 to each other for rotary movement together.

The front portion of the intermediate ring means 3 which overlaps and surrounds the rear portion of the focus ring means 2 is of a relatively large diameter. This intermediate ring means 3 has a rear portion of a smaller diameter which extends into and is surrounded by the diaphragm ring means 4. The small-diameter portion of the intermediate ring means 3 carries at its exterior a scale 11 of flash guide numbers which are uniformly distributed circumferentially along the intermediate ring means 3. Also, the small-diameter rear portion of the intermediate ring means 3 is formed with an opening 14 passing therethrough for accommodating a steel ball 12 of a second adjustable transmission means for transmitting rotary movement of the ring means 3 to the ring means 4 while at the same time permitting the latter to be angularly adjusted with respect to the ring means 3. However, this second transmission means, as is apparent from the description below, is capable of transmitting rotary movement from the intermediate ring means 3 to the diaphragm ring means 4 only when the pair of ring means 3 and 4 are in the flash position illustrated in FIG. 3.

This second transmission means includes a steel ball 12 radially urged away from the optical axis by a spring 13 shown diagrammetically in the drawings. At its front end region the diaphragm ring means 4 is provided with axial grooves 15 of V-shaped cross section circumferentially distributed about the diaphragm ring means 4 and selectively receiving the spring-pressed ball 12 so as to permit the diaphragm ring means 4 to be angularly adjusted with respect to the ring means 3 while at the same time holding the ring means 4 in its angularly adjusted position with respect to the ring means 3 while rotary movement is transmitted from the latter to the ring means 4.

Figure 2:
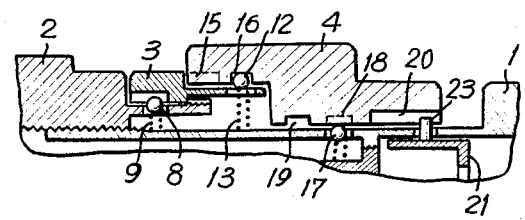
FIG. 2 is a fragmentary sectional elevation taken in a plane which contains the optical axis of the objective with the parts being shown in FIG. 2 in the non-flash position.
Figure 3:
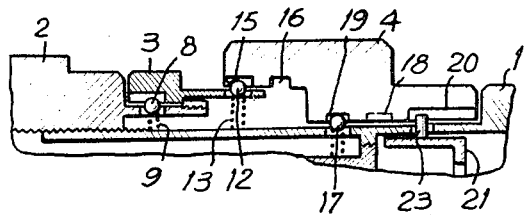
FIG. 3 shows parts of FIG. 2 in the flash position where the size of the aperture will be automatically determined by turning of the focus ring.

The intermediate ring means 3 and the diaphragm ring means 4 form a pair of ring means one of which is axially movable with respect to the other between a flash position and a non-flash position, the flash position being illustrated in FIG. 3 and the non-flash position being illustrated in FIG. 2. As is illustrated in the drawings, it is preferred with the structure of the present invention to provide an objective where it is the diaphragm ring means 4 which is axially movable with respect to the intermediate ring means 3 between the positions illustrated in FIGS. 2 and 3. Thus, the diaphragm ring means 4 is axially movable along as well as being rotatable about the lens barrel 1. The diaphragm ring means 4 carries at its rear outer peripheral portion a scale 27 of aperture settings, and the lens barrel 1 carries an index 26 which coacts with the scale 27.

As is apparent from FIGS. 2 and 3, when the diaphragm ring means 4 is in its non-flash position it overlaps the intermediate ring means 3 to a greater extent than when it is in its flash position shown in FIG. 3. The inner surface of the diaphragm ring means 4 is formed with a circumferential groove 16 extending completely around the optical axis and situated just to the rear of the axial grooves 15 of the second transmission means 12–15. When the diaphragm ring means 4 is displaced forwardly from the flash position of FIG. 3 to the non-flash position of FIG. 2, the spring-pressed ball 12 is received in the circumferential groove 16, so that in the non-flash position illustrated in FIG. 2 the ring means 4 can turn freely with respect to the ring means 3, and the second transmission means 12–15 is incapable at this time of transmitting rotary movement between the rings 3 and 4.

A releasable holding means is provided for releasably holding the diaphragm ring means 4 in a selected angular position when the diaphragm ring means 4 is in the non-flash position of FIG. 2. In this position the ring means 4 is turned by the operator to provide a preselected diaphragm during the non-flash operation. This releasable holding means includes a steel ball 17 urged radially away from the optical axis by a spring, as diagrammatically illustrated in the drawings, with the outer end of the spring and the inner portion of the ball 17 being received in an opening with the lens barrel. The inner surface of the diaphragm ring means 4 is formed with a plurality of axially extending grooves 18 which are also of V-shaped cross section and which are circumferentially distributed about the optical axis, and these grooves 18 form part of the releasable holding means with one of these grooves receiving the spring-pressed ball 17 when the diaphragm ring means 4 is in the non-flash position of FIG. 2. Thus, in this position of the objective of the invention when the diaphragm ring means 4 is turned, on the one hand it is capable of turning freely with respect to the intermediate ring means 3, and on the other hand the ball 17 together with the grooves 18 will provide the usual click-stop structure for releasably retaining the ring 4 in a selected angular position where a preselected diaphragm aperture will be provided.

When the diaphragm ring means 4 is retracted to the flash position shown in FIG. 3, a circumferential groove 19 which is formed at the interior surface of the ring means 4 forwardly of the axial grooves 18 receives the ball 17. This circumferential groove 19 extends all the way around the optical axis so that when the ball 17 is in the groove 19 the ring means 4 is freely rotatable with respect to the lens barrel 1 and thus the releasable holding means 17, 18 is operative only when the ring means 4 is in the non-flash position of FIG. 2.

The lens barrel 1 houses in its interior a rotary diaphragm ring 21 which in a well known manner is capable of setting the diaphragm to an aperture size which is determined by the angular position of the ring 21. This ring 21 fixedly carries a pin 23 which extends radially with respect to the optical axis through an arcuate slot 22 (FIG. 1) which is formed through the wall of the lens barrel 1, and the outer end of the pin 23 is received in an axial groove 20 which is formed at the inner surface of the diaphragm ring means 4 at the rear portion of the latter. This groove 20 is of sufficient length to receive the pin 23 in both of the positions of the diaphragm ring means 4 illustrated in FIGS. 2 and 3. Thus in both of these positions turning of the diaphragm ring means 4 will change the size of the exposure aperture.

As is apparent from FIG. 1, the index 24 cooperates with the scale 6 of film speeds, the index 25 cooperates with the scale 11 of flash guide numbers, and the index 26 cooperates with the scale 7 of aperture sizes.

With the above-described structure of the invention, when it is desired to carry out non-flash photography, such as photography with daylight exposure of the film, the diaphragm ring means 4 is shifted forwardly to the position shown in FIG. 2. This will cause the front end of the ring means 4 to cover the rear end of the ring means 3. The ball 12 is received at this time in the circumferential groove 16 while the ball 17 is received in one of the grooves 18. Thus, at this time when the focus ring means 2 is turned for focusing purposes, the ball 12 will simply move angularly along the groove 16 without transmitting any rotary movement to the diaphragm ring means 4. At the same time the latter ring means can be turned with respect to the ring means 3 to provide a selected aperture independently of the turning of the focus ring means 2. Thus, the diaphragm ring means 4 can be turned with the click-stop effect achieved by the movement of the ball 17 into and out of the grooves 18, to releasably hold the diaphragm ring means 4 at a selected aperture position determined by alignment of one of the graduations of the scale 27 with the index 26. This will result in rotation of the ring 21 in order to set the diaphragm in a well known manner. In the case of a single lens reflex camera, this structure may be used to preset the diaphragm to provide a preselected aperture when the diaphragm is automatically stopped down just prior to an exposure with this type of camera.

Also, at this time although the first transmission means 7–10 still connects the ring means 3 to the ring means 2 for rotary movement therewith, the second transmission means 12–16 is incapable of transmitting the rotation of the ring means 3 to the ring means 4, so that the ring means 2 can be turned together with the ring means 3, without influencing the position of the ring means 4. Thus, with the parts in the non-flash position of FIG. 2, conventional operation of the camera can be carried out. It is to be noted that at this time the scale 11 of flash guide numbers, which is of no use during non-flash operation, is covered so that it is not even visible to the operator at this time.

In order to make an exposure with synchronous flash illumination, the ring 3 is turned with respect to the ring 2 in order to position the index 24 in alignment with a selected graduation of the film speed scale 6. This is achieved with click-stop operation of the spring-pressed ball 8 with respect to the axial grooves 10. With the intermediate ring means 3 thus angularly positioned according to the speed of the film which is in the camera, the diaphragm ring means 4 is displaced rearwardly along the axis of the barrel 1 to the flash position shown in FIG. 3, so as to uncover the scale 11. At the same time the ball 12 is received in one of the grooves 15, so as to render the second transmission means operative, and simultaneously the ball 17 is received in the circumferential groove 19 so that the releasable holding means 17, 18 is rendered ineffective to releasably hold the diaphragm ring means 4 in a selected angular position. Thus, the diaphragm ring means 4 is disengaged from the barrel 1, and there is no click-stop effect which otherwise would be provided by the releasable holding means 17, 18, and at the same time the second transmission means 12–15 connects the pair of rings means 3 and 4 so that they will rotate as a unit. However, this second transmission means enables the ring means 4 to be turned with respect to the ring means 3, with a click-stop effect between the ball 12 and the grooves 15, until the index 25 is aligned with a flash guide number of the scale 11 corresponding to the particular type of flash which is used with the camera. Of course, it is possible to rotate the rings 2 and 3, as a unit, with respect to the ring 4, in order to align a selected graduation of the scale 11 with the index 25. Thus, the relative angular position of the rings 3 and 4 with respect to each other is determined in accordance with the flash guide number, and the angular position of the rings 3 and 4 as a unit with respect to the ring 2 is determined in accordance with the film speed. As a result, with both of the first and second transmission means operating, when the focus ring means 2 is turned the diaphragm will be automatically set in accordance with these factors of the film speed and flash guide number.

Therefore, in the flash position shown in FIG. 3 the operator need only focus the objective on the object which is to be photographed, and the diaphragm will be automatically adjusted to provide an aperture which is proper for the flash operation. The size of the aperture will of course be determined by the angular position to which the focus ring means 2 is turned, so that an aperture is provided in accordance with the distance from the camera to the object which is to be photographed, and in accordance with the factors of film speed and flash guide number, so that the synchronous flash operation can be carried out with a proper aperture simply by focusing the camera on the object.

It is apparent that with the above structure of the invention an exceedingly simple and at the same time highly accurate structure is provided for achieving normal camera adjustment with non-flash operation and automatic diaphragm setting during flash operation. The structure is exceedingly simple to operate with no possibility of error from the presence of the flash guide number scale 11 since the latter is visible only during flash operation.

What is claimed is:

1. In a camera objective, elongated lens barrel means, focus ring means coaxially surrounding said lens barrel means and rotatable with respect thereto for focusing the objective, diaphragm ring means coaxially surrounding said lens barrel means and rotatable with respect thereto for setting a diaphragm to determine the size of the exposure aperture, intermediate ring means coaxially surrounding said lens barrel means and being rotatable with respect thereto, said intermediate ring means being situated between said focus ring means and said diaphragm ring means, said diaphragm ring means and intermediate ring means forming a pair of ring means one of which is axially movable along the lens barrel means with respect to the other between a flash position for making an exposure with flash illumination and a non-flash position for making an exposure without flash illumination, said focus ring means and intermediate ring means having exterior surfaces situated adjacent each other and one of the latter surfaces carrying a scale of film speeds while the other carries an index to be aligned with a graduation of the latter scale, for selectively positioning said intermediate ring means with respect to said focus ring means at an angular position in accordance with film speed, first adjustable transmission means interconnecting said focus ring means and intermediate ring means for providing for angular adjustment of said intermediate ring means with respect to said focus ring means according to film speed while transmitting rotary movement of said focus ring means to said intermediate ring means with the latter retained in its angularly adjusted position with respect to said focus ring means, said intermediate ring means and diaphragm ring means having a pair of exterior surfaces adjoining each other when said pair of means are in their flash position, and one of the latter surfaces carrying a scale of flash guide numbers while the other of the latter surfaces carries an index to be aligned with said scale of flash guide number for angularly adjusting said pair of ring means one with respect to the other according to a selected flash guide number, second adjustable transmission means interconnecting said intermediate ring means and diaphragm ring means for providing for angular adjustment of the latter two ring means one with respect to the other according to a selected flash guide number when said pair of ring means are in their flash position while transmitting rotary movement of said intermediate ring means to said diaphragm ring means when said pair of ring means are in their flash position, so that when said pair of ring means are in their flash position rotary movement of said focus ring means will be transmitted through said intermediate ring means to said diaphragm ring means for automatically setting the camera diaphragm in accordance with the film speed setting of said intermediate ring means and flash guide number setting of said diaphragm ring means, said second adjustable transmission means being operatively connected with said pair of ring means for transmitting rotary movement from said intermediate ring means to said diaphragm ring means only when said pair of ring means are in their flash position, so that when said pair of ring means are in their non-flash position said diaphragm ring means is freely rotatable with respect to said intermediate ring means, and releasable holding means coacting with said diaphragm ring means for releasably holding the latter in a selected diaphragm-setting position only when said pair of ring means is in its non-flash position, and said diaphragm ring means is freely rotatable with respect to said lens barrel means to turn together with said intermediate ring means by the action of said second transmission means when said pair of ring means are in their flash position.

2. The combination of claim 1 and wherein that one of said surfaces which carries said scale of flash guide numbers is covered by one of said pair of ring means when said pair of ring means are in their non-flash position, whereby said scale of flash guide numbers is visible only when said pair of ring means are in their flash position.

3. The combination of claim 1 and wherein said pair of ring means have a pair of annular surfaces which overlap each other to a greater extent when said pair of ring means are in their non-flash position than when said pair of ring means are in their flash position, said second transmission means including a spring-pressed ball at one of the latter overlapping surfaces while the other of the latter surfaces is formed with a plurality of axial grooves of V-shaped cross section forming also part of said second transmission means and selectively receiving said ball for transmitting rotary movement from said intermediate ring means to said diaphragm ring means while providing for selective angular adjustment of said pair of ring means one with respect to the other, said other of said pair of overlapping surfaces being formed with an annular groove axially displaced from said axial grooves and receiving said ball when said pair of ring means are in their non-flash position for preventing transmission of rotary movement from said intermediate ring means to said diaphragm ring means when said pair of ring means are in their non-flash position.

4. The combination of claim 3 and wherein said diaphragm ring means is axially movable along said lens barrel with respect to said intermediate ring means between said flash and non-flash positions, said releasable holding means including a spring-pressed ball carried by said lens barrel and a plurality of circumferentially distributed axial grooves formed in said diaphragm ring means and selectively receiving the latter spring-pressed ball for releasably holding said diaphragm ring means in a selected aperture position when said diaphragm ring means is in its non-flash position with respect to said intermediate ring means, said diaphragm ring means being formed with a circumferential groove axially displaced from said axial grooves thereof and receiving said spring-pressed ball of said releasable holding means when said diaphragm ring means is in said flash position thereof for releasing said diaphragm ring means for rotary movement together with said intermediate ring means through said second transmission means.

5. The combination of claim 4 and wherein said lens barrel means carries in its interior a rotary diaphragm ring, the latter ring having a pin projecting therefrom and said lens barrel means being formed with an arcuate slot through which said pin extends, said diaphragm ring means being formed with an elongated axial groove receiving said pin in both positions of said diaphragm ring means.

6. The combination of claim 1 and wherein said focus ring means is situated at the region of the front end of said lens barrel means while said diaphragm ring means is situated behind said focus ring means with said intermediate ring means located between said focus ring means and diaphragm ring means.

7. The combination of claim 6 and wherein said diaphragm ring means forms that one of said pair of ring means which is axially movable with respect to the other, said diaphragm ring means being shiftable forwardly along said lens barrel toward said focus ring means and with respect to said intermediate ring means to assume said non-flash position and rearwardly along said lens barrel away from said focus means to assume said flash position.

* * * * *